US010999230B2

(12) United States Patent
Sachdeva et al.

(10) Patent No.: US 10,999,230 B2
(45) Date of Patent: May 4, 2021

(54) RELEVANT CONTENT SURFACING IN COMPUTER PRODUCTIVITY PLATFORMS

(71) Applicant: Microsoft Technology Licensing, LLC, Redmond, WA (US)

(72) Inventors: Ravin Sachdeva, Seattle, WA (US); Savio Mendes de Figueiredo, Bothell, WA (US); Mauricio Cunille Blando, Seattle, WA (US); Santosh Kumar, Sammamish, WA (US); Kiran Phani Kaja, Sammamish, WA (US); Haroon Dawood Barri, Bothell, WA (US); Alexey Razuvaev, Issaquah, WA (US); Krish Gali, Bellevue, WA (US); Kalyan Ayloo, Bothell, WA (US); Ryan Thomas Murphy, Seattle, WA (US); Shravya Konda, Redmond, WA (US); Luiz Gustavo Bustamante Magalhaes, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 207 days.

(21) Appl. No.: 15/987,789

(22) Filed: May 23, 2018

(65) Prior Publication Data

US 2019/0364003 A1    Nov. 28, 2019

(51) Int. Cl.
*H04L 12/58* (2006.01)
*G06F 40/289* (2020.01)
(Continued)

(52) U.S. Cl.
CPC ............ *H04L 51/18* (2013.01); *G06F 40/289* (2020.01); *G06F 40/30* (2020.01); *H04L 67/10* (2013.01)

(58) Field of Classification Search
CPC ......... H04L 51/18; H04L 67/10; H04L 51/26; G06F 40/289; G06F 40/30; G06Q 10/06311; G06Q 10/107
See application file for complete search history.

(56) References Cited

U.S. PATENT DOCUMENTS 7,584,253 B2  9/2009  Curbow et al.
7,895,209 B2  2/2011  Spence et al.
(Continued)

FOREIGN PATENT DOCUMENTS

WO    2017189227 A1    11/2017

OTHER PUBLICATIONS

Bellotti, et al., "Taking Email to Task: The Design and Evaluation of a Task Management Centered Email Tool", In Proceedings of the SIGCHI Conference on Human Factors in Computing Systems, vol. 5, Issue 1, Apr. 5, 2003, 8 Pages.
(Continued)

*Primary Examiner* — Wing F Chan
*Assistant Examiner* — Billy H Ng
(74) *Attorney, Agent, or Firm* — Liang IP, PLLC

(57) ABSTRACT

Techniques of relevant content surfacing in a computer productivity platform are disclosed herein. In one embodiment, a method includes receiving, at an email server of the computer productivity platform, an email having a message body containing content and determining whether the content of the email contains a request to or a commitment by the user. In response to determining that the content of the email contains a request to or a commitment, inserting metadata containing one or more properties of the request or commitment into the email, the metadata. Then, when viewing of the content of the email by the user is detected, the computer productivity platform is queried for additional content using the properties of the request or commitment as
(Continued)

keywords. The additional content is then surfaced to the user as being related to the content in the message body of the email.

20 Claims, 9 Drawing Sheets

(51) Int. Cl.
*H04L 29/08* (2006.01)
*G06F 40/30* (2020.01)

(56) References Cited

U.S. PATENT DOCUMENTS

| | | | |
|---|---|---|---|
| 8,766,793 | B2 | 7/2014 | Elumalai et al. |
| 9,058,588 | B2 | 6/2015 | Bier |
| 9,170,993 | B2 | 10/2015 | Kalia et al. |
| 9,369,333 | B1* | 6/2016 | Chiu ................ H04L 51/34 |
| 9,600,769 | B1 | 3/2017 | Liu et al. |
| 9,606,972 | B2 | 3/2017 | Filman et al. |
| 9,852,401 | B2 | 12/2017 | Lindsay et al. |
| 2006/0218232 | A1* | 9/2006 | Kubala ............. G06Q 10/107 709/206 |
| 2008/0307046 | A1 | 12/2008 | Baek et al. |
| 2010/0131523 | A1 | 5/2010 | Yu et al. |
| 2010/0293236 | A1* | 11/2010 | Wisner ............. G06Q 10/107 709/206 |
| 2011/0298701 | A1 | 12/2011 | Holzer et al. |
| 2012/0245925 | A1* | 9/2012 | Guha .................. G06F 40/20 704/9 |
| 2013/0124646 | A1 | 5/2013 | Kraft et al. |
| 2013/0290079 | A1* | 10/2013 | Chavan ............. G06Q 30/0251 705/14.4 |
| 2014/0082521 | A1 | 3/2014 | Carolan et al. |
| 2014/0172986 | A1 | 6/2014 | Kumar et al. |
| 2014/0337439 | A1* | 11/2014 | Baker .................... H04L 51/12 709/206 |
| 2015/0294220 | A1 | 10/2015 | Oreif |
| 2016/0269336 | A1 | 9/2016 | Blinder et al. |
| 2016/0335572 | A1* | 11/2016 | Bennett ............ G06Q 10/06311 |
| 2016/0337295 | A1 | 11/2016 | Bennett et al. |
| 2017/0004396 | A1 | 1/2017 | Ghotbi et al. |
| 2019/0140996 | A1* | 5/2019 | Silberstein ........... G06Q 10/107 |

OTHER PUBLICATIONS

Benjamin, Jalen, "What are Google Now Cards? How to tailor them to your needs", Retrieved from <<http://www.androidguys.com/2015/09/09/google-now-cards-tailor-needs/>>, Sep. 9, 2015, 8 Pages.

Burkhart, et al., "Process Interoperability Through Proactive e-mail Annotations", In Proceedings of the Second International Conference on the Applications of Digital Information and Web Technologies, Aug. 4, 2009, 6 Pages.

Kowalkiewicz, et al., "Improving Information Quality in Email Exchanges by Identifying Entities and Related Objects", In Proceedings of the 2nd ACM workshop on Information credibility on the web, Oct. 30, 2008, 4 Pages.

"International Search Report and Written Opinion Issued in PCT Application No. PCT/US19/032069", dated Sep. 6, 2019, 14 Pages.

* cited by examiner

RELEVANT CONTENT SURFACING IN COMPUTER PRODUCTIVITY PLATFORMS

BACKGROUND

Corporations, schools, charities, government offices, and other types of enterprises often deploy computer productivity platforms configured to allow members of an enterprise to share information. For example, a computer productivity platform can include a file management system that is configured to store, track, or otherwise manage internal documents of an enterprise. In another example, a computer productivity platform can also include an electronic communications system for handling emails, contacts, instant messages, or other suitable types of messages.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Computer productivity platforms can provide users of an enterprise many productivity services to facilitate communications, storage, and management of various types of content within the enterprise. For example, a computer productivity platform can include repositories that provide storage services for storing documents, videos, audios, or other types of content. A computer productivity platform can also include a file management system configured to apply access control, retention, or other suitable content management policies. In a further example, a computer productivity platform can include electronic communications services configured to facilitate exchange of emails, instant messages, or other types of messages.

While a computer productivity platform can provide many productivity services to users, locating relevant content may still be cumbersome and inefficient. For example, a first user can send a first email to a second user using an electronic communications service to request a document or other information related to a project. In response, the second user can send a second email promising to provide such information by a due date. The second user can then track the due date in, for instance, a calendar system as a task and manually search and/or browse through many documents, folders, emails, or other suitable sources in order to locate relevant information requested by the first user. Once the second user provides the located information to the first user, the second user can then mark the task as complete.

Such content locating operations are cumbersome and inefficient because each of the tracking, searching, and/or browser is performed manually. In addition, such content locating operations can be error prone. For instance, the second user may docket the due date incorrectly to miss the due date. The second user may also fail to search and/or browse one or more repositories for relevant information. As such, information provided to the first user may be incomplete.

Several embodiments of the disclosed technology can address at least some aspects of the foregoing challenges by implementing an intelligent content surfacing technique. In one implementation, a communications service (e.g., email service) can deploy a content scanner configured to detect a request or a commitment included in an incoming or outgoing email. For instance, in the example above, the content scanner can scan the first email from the first user to the second user and detect that the first email contains a request, in particular, for a document. The content scanner can also scan the second email from the second user to the first user and detect that the second email contains a commitment by the second user.

The content scanner can then insert or append additional metadata to the incoming or outgoing email indicating the detected request or commitment and associated properties thereof. For instance, the content scanner can insert additional metadata to the first email indicating a request and certain properties of the request, such as for a document that is related to the project and an urgency of request. The content scanner can also insert additional metadata to the second email indicating a commitment and related properties, such as the due date, the document related to the commitment, or other suitable information. Once insertion of the metadata is complete, the first and second emails may be forwarded to respective inboxes of the first and second users on corresponding email servers.

Several embodiments of the disclosed technology can also be directed to a content surface engine configured to detect a user activity and intelligently surface relevant content related to the user activity to the user. In one implementation, the content surface engine can be a component of an email client application (e.g., Outlook®) executing on a computing device. In other implementations, the content surface engine can be a standalone application or a part of an application suite executing on the computing device. In further implementations, the content surface engine can also be provided as computing service by executing a suitable application in a server of the computer productivity platform.

In one aspect, the content surface engine can be configured detect emails in a user's inbox that contain a request or commitment based on the metadata inserted by the content scanner. The content surface engine can then surface detected emails as a list in, for example, a viewing pane of the email client application separate from other viewing panes of additional emails. In certain embodiments, the surfaced emails can be sorted based on one or more properties of the request or commitment. For example, the emails can be sorted in a descending order based on a due date, urgency, or other suitable properties. In other embodiments, the surface emails may be sorted based on a date/time of reception, presence of attachments, or other suitable criteria.

The content surface engine can also be configured to detect that a user is viewing a particular email containing a request or commitment. For example, the content surface engine can detect that a particular email is open or is previewed in a preview pane. In response to the detected user activity, the content surface engine can be configured to automatically, or upon user actuation, to query additional systems in a computer productivity platform using the properties of the request or commitment as keywords or other suitable searching criteria. The content surface engine can then retrieve suitable information from the various systems in the computer productivity platform and surface one or more content items to the user.

For instance, in the example above, when the second user is viewing the first email from the first user on an email client application executing on a computing device, the content surface engine can detect that the first email contains a request and associated properties. In one implementation, the content surface engine (or other components of the email client application) can be configured to provide an indicator (e.g., a flag, a hyperlink, etc.) on a user interface of the email client application to indicate that additional information may exist. Upon detecting that the second user is viewing the email and has actuated the indicator (e.g., by clicking on the hyperlink), the content surface engine can transmit one or more query requests to various systems in the computer productivity platform to request additional information. For instance, a query request may be transmitted to an email server to locate all emails related to the project. Another query request may be transmitted to a file management system to locate the requested document. A further query request may be transmitted to a contact server to locate a group of additional users belonging to a team working on the project.

Upon retrieving the foregoing additional information, the content surface engine can output or surface the retrieved additional information via the user interface of the email client application to the second user. As such, the second user would have at least some if not all information needed to respond to the request from the first user. Thus, the second user may efficiently locate the additional information in order to respond to the first user without burdensome and time consuming manual searching or browsing of various sources in the computer productivity platform.

The content surface engine can also be configured to query all suitable sources for the additional information. As such, incomplete or inaccurate information or other errors related to the requested document may be avoided. In other implementations, the content surface engine can be configured to initiate the foregoing querying and surfacing operations upon detecting that the second user is viewing the first email without additional input from the second user. In addition, once the second user has responded to the first email with the additional information, the content surface engine can be configured to automatically mark the request in the first email as complete. As such, the second user no longer need to manually track a response to the first email from the first user.

DETAILED DESCRIPTION

Figure 1:
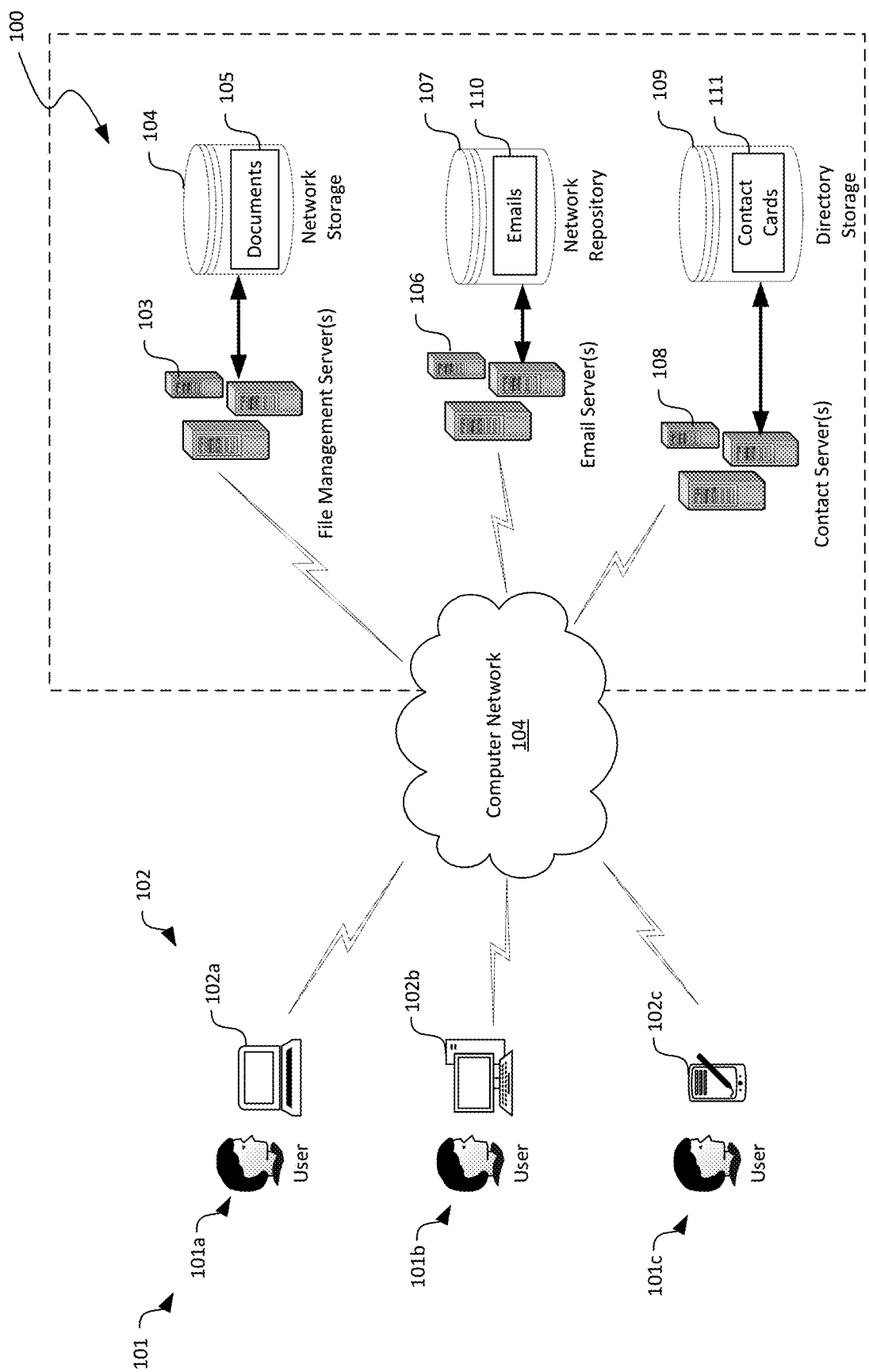
FIG. 1 is a schematic diagram illustrating a computer productivity platform in accordance with embodiments of the disclosed technology.

Certain embodiments of systems, devices, components, modules, routines, data structures, and processes for relevant content surfacing in computer productivity platforms are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1-5.

As used herein, the term "content" generally refers to items of subjects, topics, or other suitable types of information contained in digital data packages. For example, a content item can include a digital document containing text, images, sounds, videos, or animations stored in a computer repository. The document can be in plain text format, Word® format, Portable Document Format ("PDF"), Hypertext Markup Language ("HTML"), Extensible Markup Language ("XML"), or other suitable formats. In another example, a content item can include a website with one or more webpages accessible via the computer network. In additional examples, content items can include emails, text messages, instant messages, contact cards, or other suitable types of information.

As used herein, the term "computer productivity platform" generally refers to a computer platform having multiple servers interconnected by a computer network and being configured to provide a group of productivity software and related computer services. Examples of productivity software can include word processors, on-line storages, spreadsheet applications, email exchanges, electronic calendars, etc. One example computer productivity platform is Office 365 provided by Microsoft Corporation of Redmond, Wash.

As used herein, the term "email" generally refers to digital messages exchanged between users using electronic devices. An email can include a header, a message body, and associated metadata. In accordance with embodiments of the disclosed technology, metadata of an email can contain information indicating whether an email contains a request to or a commitment by a user. A "request" represents a solicitation for information. A "commitment" represents a promise to provide certain information. Both request and commitment can have associated properties. Example of such properties can include an identification, a description, or a due date of the requested content item. One example data structure suitable for an email is described below with reference to FIG. 3.

Also, the term "email server" generally refers to computer dedicated to running such applications that are configured to receive incoming emails from senders and forward outgoing emails to recipients via a computer network, such as the Internet. Examples of such applications include Microsoft Exchange®, qmail, Exim, and sendmail. An email server can maintain and/or access one or more inboxes for corresponding users. Further used herein, an "inbox" is a file folder configured to contain data representing incoming emails for a user. The email server can also maintain and/or access one or more outboxes configured to contain outgoing emails and/or other suitable mailboxes.

Computer productivity platforms can provide users of an enterprise many productivity services to facilitate communications, storage, and management of various types of content within the enterprise. For example, a computer productivity platform can include repositories that provide storage services for storing documents, videos, audios, or other types of content. A computer productivity platform can also include a file management system configured to apply access control, retention, or other suitable content management policies. In a further example, a computer productivity platform can include electronic communications services configured to facilitate exchange of emails, instant messages, or other types of messages.

While a computer productivity platform can provide many productivity services to users, locating relevant content may still be cumbersome and inefficient. For example, a first user can send a first email to a second user using an electronic communications service to request a document or other information related to a project. In response, the second user may manually search and/or browse through many documents, folders, emails, or other suitable sources in order to locate relevant files, emails, or other suitable information requested by the first user.

Such content locating operations are cumbersome and inefficient because each of the tracking, searching, and/or browser is performed manually. In addition, such content locating operations can be error prone. For instance, the second user may docket the due date incorrectly to miss the due date. The second user may also fail to search and/or browse one or more repositories for relevant information. As such, information provided to the first user may be incomplete.

Several embodiments of the disclosed technology can address at least some aspects of the foregoing challenges by implementing an intelligent content surfacing technique. In certain embodiments, a content surface engine can be configured to detect a user activity and context of the user activity and intelligently surface relevant content related to the user activity to the user. As such, a user no longer needs to manually search or browse various sources before a response can be provided, as described in more detail below with reference to FIGS. 1-5.

FIG. 1 is a schematic diagram illustrating a computer productivity platform 100 implementing relevant content surfacing in accordance with embodiments of the disclosed technology. As shown in FIG. 1, the computer productivity platform 100 can include a computer network 104 interconnecting client devices 102 of individual users 101 and one or more file management servers 103, email servers 106, and contact servers 108. The computer network 104 can include an enterprise intranet, a social network, the Internet, or other suitable types of network.

The computer productivity platform 100 can also include a network storage 104 operatively coupled to the file management servers 103, a network storage repository 107 operatively coupled to the email servers 106, and a directory storage 109 operatively coupled to the contact servers 108. As shown in FIG. 1, the network storage 104 can be configured to store records of documents 105 accessible to the client devices 102 via the computer network 104. The network repository 107 can also be configured to store records of emails 110 of the individual users 101. The directory storage 109 can be configured to store records of digital contact cards 111 corresponding to the users 101.

Even though particular components and associated arrangements of the computer productivity platform 100 are shown in FIG. 1, in other embodiments, the computer productivity platform 100 can include additional and/or different components. For example, in certain embodiments, the network repository 107, the network storage 104, and/or the directory storage 109 can be combined into a single physical or logical storage space. In other embodiments, the computer productivity platform 100 can also include electronic calendar systems, instant message systems, voice-over-IP systems, or other suitable types of computer systems.

The client devices 102 can individually include a computing device that facilitates access to various resources, such as emails at the network repository 108, via the computer network 104 by the users 101 (identified as first, second, and third users 101a-101c). For example, in the illustrative embodiment, the first computing device 102a includes a laptop computer. The second computing device 102b includes a desktop computer. The third computing device 102c includes a tablet computer. In other embodiments, the client devices 102 can also include smartphones or other suitable computing devices. Even though three users 101 are shown in FIG. 1 for illustration purposes, in other embodiments, the computer productivity platform 100 can facilitate operations by any suitable number of users 101 via the computer network 104.

In certain embodiments, the file management servers 103, the email servers 106, and the contact servers 108 can individually include one or more interconnected computer servers, as shown in FIG. 1. In other embodiments, the foregoing components of the computer productivity platform 100 can each include a cloud-based service hosted on one or more remote computing facilities such as datacenters. In further embodiments, certain components (e.g., the contact servers 108) may be omitted from the computer productivity platform 100 and be provided by external computing systems (not shown).

The file management servers 103 can be configured to implement certain policies to facilitate access of the documents 105 via the computer network 104. For example, in one embodiment, the file management servers 103 can implement access control policies such that certain class, type, category, or other suitable grouping of the documents 105 can be accessible to specified users 101. In another embodiment, the file management servers 103 can also implement file retention policies such that certain class, type, category, or other suitable grouping of the documents 105 can be automatically deleted or purged from the network storage 104. In further embodiments, the file management servers 103 can implement other suitable types of policies in order to regulate storing, editing, accessing, purging, or other suitable operations on the documents 105.

The contact servers 108 can be configured to facilitate storage, revision, or other suitable functionalities of managing contact information of the users 101 or groups of users 101. For example, the contact servers 108 can be configured to organize records of contact cards 111 individually containing an email address, phone number, address, or other suitable information of the users 101. In another example, the contact servers 108 can also be configured to create and maintain contact cards 111 for a group of users 101, for instance, as team members of a particular project. In further examples, the contact servers 108 can be configured to respond to queries and provide a list of contact cards 111 of users 101 according to one or more keywords, such as user names, email addresses, project names, etc.

The email servers 106 can be configured to running suitable applications that are configured to receive incoming emails from senders and forward outgoing emails to recipients via the computer network 104, such as the Internet. In certain implementations, the email servers 106 can be configured to maintain and/or access one or more inboxes for corresponding users 101. For instance, each of the users 101 can have a corresponding inbox at the network repository 107 maintained by the email servers 106. As described in more detail below with reference to FIGS. 2A-2E, the email servers 106 can also be configured to scan content of the emails of the users 101 and add one or more properties of the scanned content as metadata to the emails. The client devices 102 can then utilize such metadata for surfacing additional relevant content to the users 101.

Figure 2A:
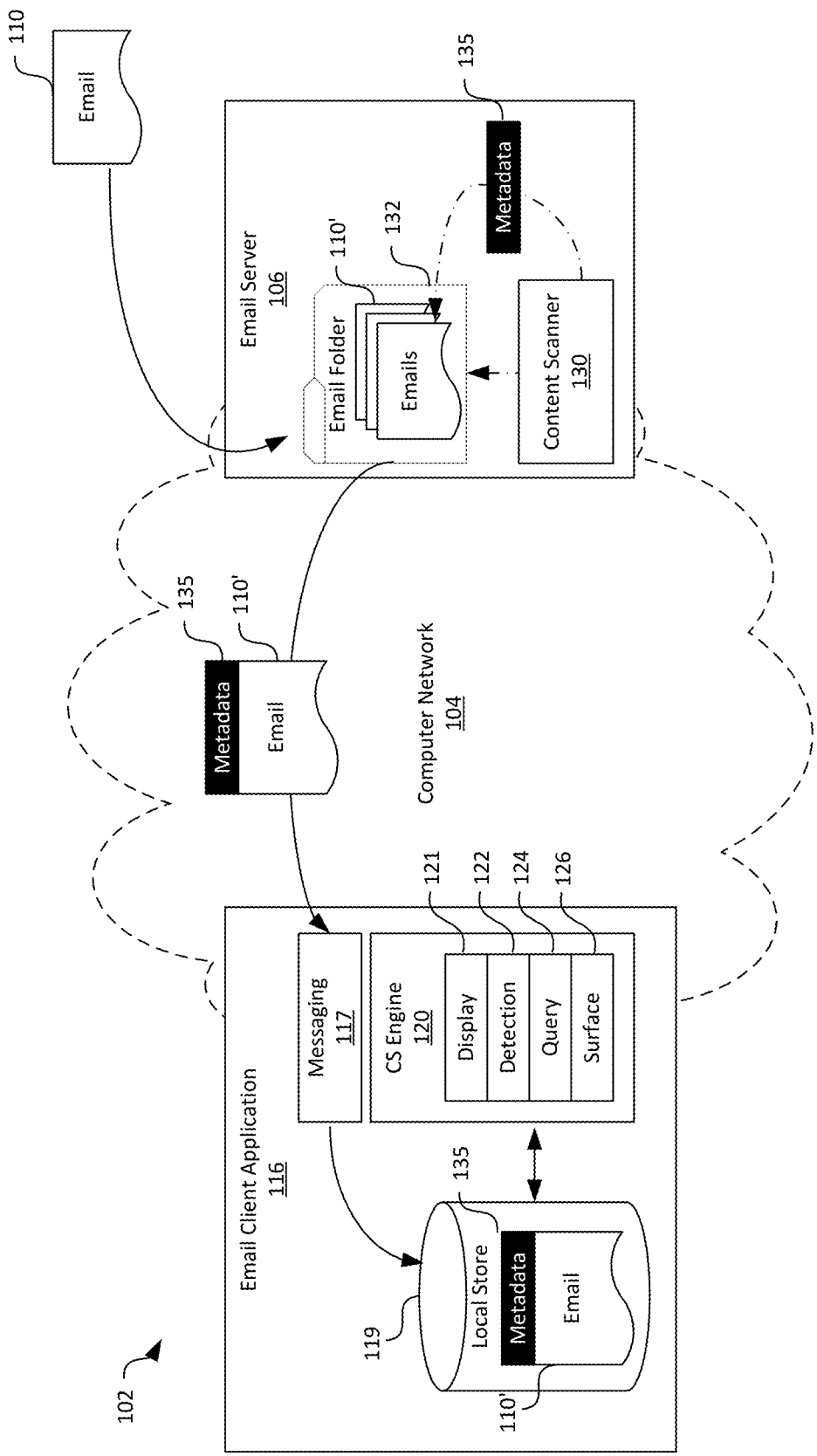
FIGS. 2A-2C are schematic diagrams illustrating certain hardware/software components of the computer productivity platform of FIG. 1 in accordance with embodiments of the disclosed technology.
Figure 2B:
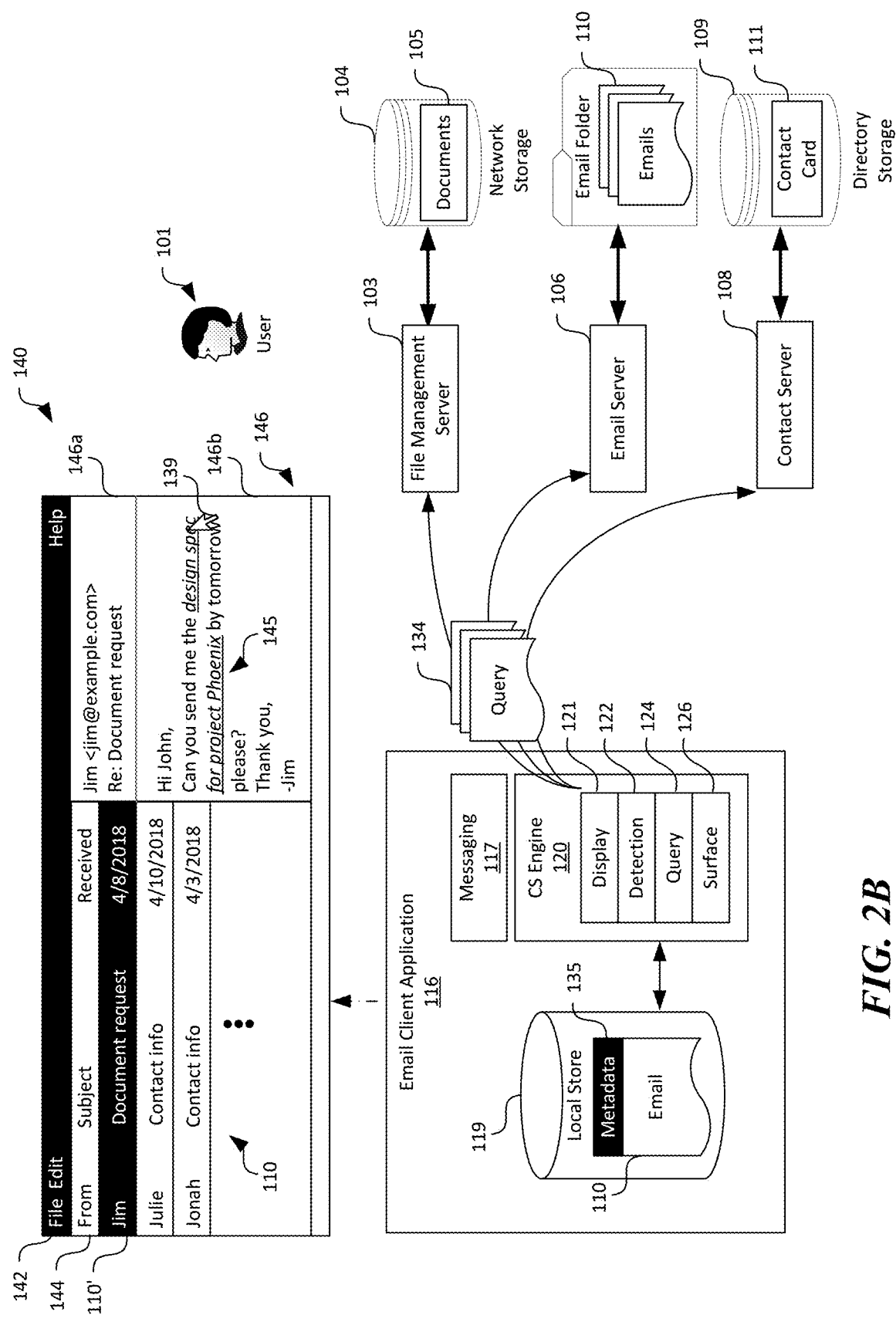
Figure 2C:
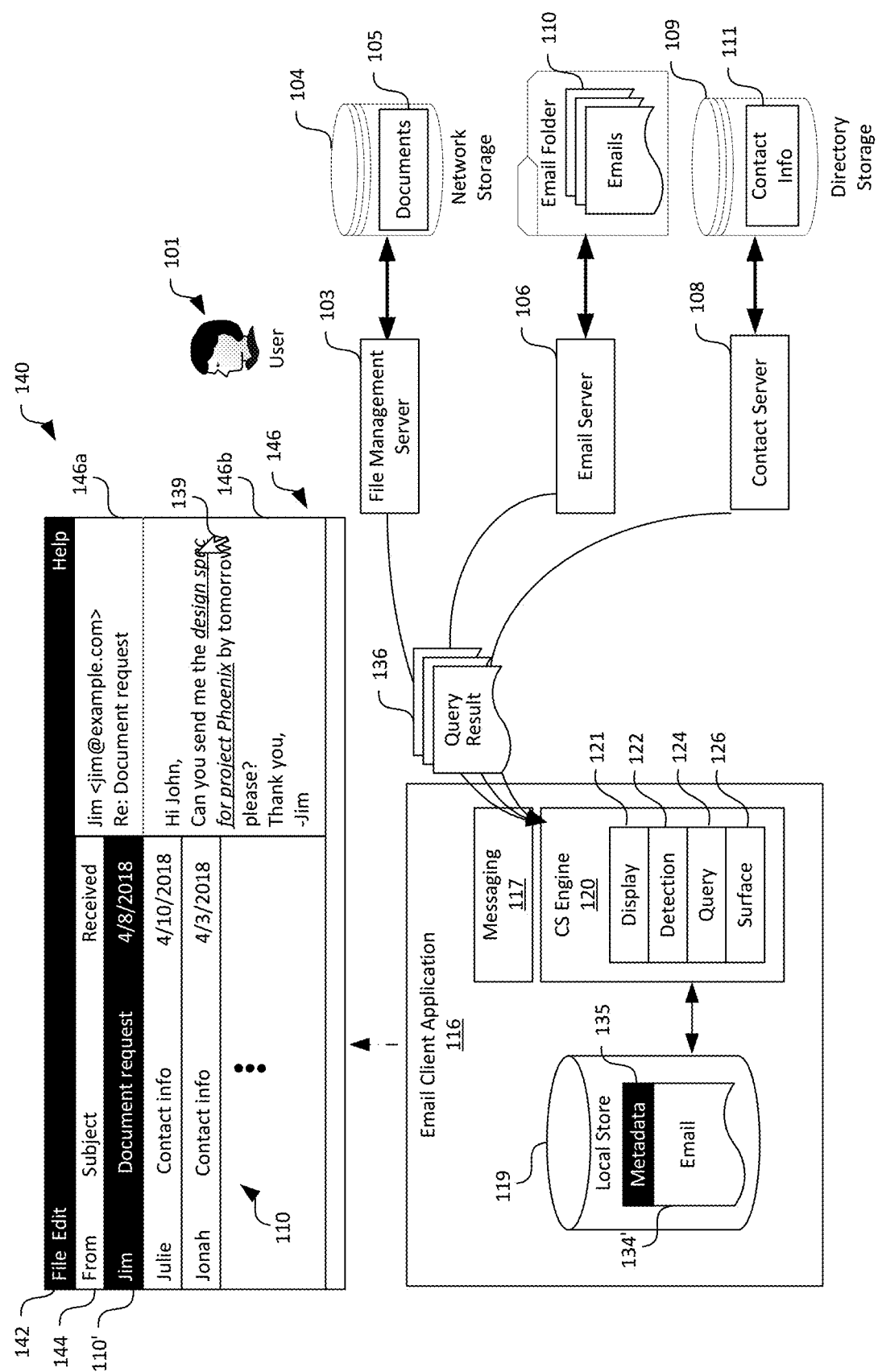

FIGS. 2A-2C are schematic diagrams illustrating certain hardware/software components of the computer productivity platform 100 of FIG. 1 in accordance with embodiments of the disclosed technology. In FIGS. 2A-2D and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads). In certain embodiments, the various components and modules described below can be implemented with actors. In other embodiments, generation of the application and/or related services can also be implemented using monolithic applications, multi-tiered applications, or other suitable components.

Components within a system can take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices. Equally, components may include hardware circuitry.

A person of ordinary skill in the art would recognize that hardware may be considered fossilized software, and software may be considered liquefied hardware. As just one example, software instructions in a component may be burned to a Programmable Logic Array circuit, or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2A, the email server 106 can maintain one or more email folders 132 (only one is shown for illustration purposes) corresponding to each user 101 (FIG. 1) for storing emails 110 destined to and transmitted by the users 101. For example, as shown in FIG. 2A, the email server 106 can receive an email 110 destined to a user 101 and store the received email 110 in the email folder 132. The email folder 132 can also include sub-folders such as an inbox sub-folder, a send sub-folder, a deleted sub-folder, and/or other suitable types of sub-folders.

The email server 106 can also include a content scanner 130 configured to scan content of each email 110 in order to identify one or more requests or commitments included in the emails 110 continuously, upon reception/transmission, or at other suitable basis. The content scanner 130 can implement various semantic or syntactic policies in order to detect a request or commitment. In one example, when the content scanner 130 detects phrases such as "can you," "please," or "could you" followed by "send me," the content scanner 130 may determine that the email 110 contains a request. In another example, when the content scanner 130 detects phrases such as "I will" followed by "send" or other suitable similar verbs, the content scanner 130 can determine that the email 110 contains a commitment. Other suitable implementations of the content scanner 130 are described in U.S. patent application Ser. Nos. 14/714,109 and 14/714,137, the disclosures of which are incorporated herein by reference.

As shown in FIG. 2A, the content scanner 130 can also be configured to store an indication of as well as related properties of the detected requests or commitments as metadata in the emails 110'. Example properties can include an identification of a content item (e.g., document), a description of the content item, or a due date of the content item. For instance, when the content scanner 130 detects a request in the received email 110, the content scanner 130 can add metadata 135 containing a description such as "design spec for project Phoenix" in the email 110. In another example, the content scanner 130 can convert a due date such as "by next Monday" into a numerical value of a date and add the converted numerical value as metadata 135 to the email 110.

As shown in FIG. 2A, the client device 102 can execute an email client application 116 configured to facilitate retrieving, viewing, composing, sending, and/or other suitable operations related to the emails 110. In certain embodiments, the email client application 116 can be a standalone application such as Outlook provided by Microsoft Corporation of Redmond, Wash. In other embodiments, the email client application 116 can also be a web-based application, such as Gmail provided by Google Inc. or Mountain View Calif. In further embodiments, the email client application 116 can have other suitable configurations.

In the illustrated embodiment, the email client application 116 can include a messaging component 117, a content surface engine 120 (shown in FIG. 2A as "CS engine 120"), and a locate store 119 operatively coupled to one another. The messaging component 117 can be configured to retrieve, send, synchronize, and/or perform other suitable operations related to receiving/transmitting emails 110 from the email folder 132 at the email sever 106. For example, as shown in FIG. 2A, the messaging component 117 can be configured to retrieve the email 110' with the added metadata 135 by the content scanner 130 from the email server 106, and store the retrieved email 110' in the local store 119.

The content surface engine 120 can be configured to output or surface additional content from the computer productivity platform 100 (FIG. 1) utilizing the metadata 135 included with the email 110'. As shown in FIG. 2A, the content surface engine 120 can include a display module 121, a detection module 122, a query module 124, and a surface module 126 operatively coupled to one another. In other embodiments, the content surface engine 120 can also include network communications modules, input/output modules, or other suitable types of modules.

The display module 121 can be configured to selectively output certain emails 110 from the local store 119 via a user interface (e.g., a viewing pane, referred to herein as "action pane" 144 shown in FIG. 2B) configured to list only emails with pending tasks or action items. In one implementation, the display module 121 can be configured to scan the metadata 135 included with the email 110' and determine whether the metadata 135 includes an indication that the email 110' contains a request or commitment.

As shown in FIG. 2B, in response to determining that the email 110' contains a request or commitment, the display module 121 can output the email 110' in the action pane 144 of a user interface 140 of the email client application 116. In the illustrated embodiment, the user interface 140 can include a menu bar 142 containing menu items such as "File," "Edit," and "Help." The user interface 140 can also include the action pane 144 having a list of emails 110 with various email fields such as "From," "Subject," and "Received." The user interface 140 can further include a preview pane 146 in which a message body of an email 110 may be outputted to the user 101. In the illustrated example, the email from "Jim" with the subject "Document request" is previewed in the preview pane 146, which shows content of a message body of the email 110 as "Hi John, can you send me the design spec for project Phoenix by tomorrow please? Thank you,—Jim." In other embodiments, the user interface 140 can also include additional panes such as an inbox pane (not shown), email fields, menu items, action controls, etc.

As shown in FIG. 2B, the display module 121 can also be configured to output the email 110' on the preview pane 146 with an indicator 145 that indicates to the user 101 that the additional content is available from the computer productivity platform 100. In the illustrated example, the indicator 145 includes a hyperlink of "design spec for project Phoenix." In other examples, the indicator 145 can also include a flag, a balloon, or other suitable types of graphical user interface (GUI) element. Even though only one indicator 145 is shown in FIG. 2B, in other embodiments, multiple indicators 145 (not shown) may be outputted to the user 101 to indicate multiple requests and/or commitments are included in the email 110.

The detection module 122 can be configured to detect a user activity such as viewing the email 110 via the user interface 140. For instance, in one example, the detection module 122 can be configured to indicate that the user 101 is viewing content of the email 110' when the message body of the email 110' is outputted in the preview pane 146. In another example, the detection module 122 can be configured to indicate that the user 101 is viewing content of the email 110' when the message body is displayed in another window (not shown) of the email client application 116 when, for instance, the user 101 double clicks on the email 110' in the action pane 144. In a further example, the detection module 122 can be configured to indicate that the user 101 is viewing content of the email 110' when the user 101 provides a user input (e.g., a click as represented by the cursor 139) on the indicator 145. Upon detecting that the user 101 is viewing the email 110', the detection module 122 can indicate accordingly to the query module 124.

Upon receiving an indication from the detection module 122 that the user 101 is viewing the content of the email 110', the query module 124 can be configured to query one or more of the file management server 103, email server 106, or contact server 108 for additional content using the one or more properties in the metadata 135 of the email as one or more keywords. For instance, in the illustrated example, the query module 124 can be configured to transmit a query 134 the file management server 103 for any document having the description or title "design spec for project Phoenix." The query module 124 can also transmit another query 134 the email server 106 for any emails 110 that contain "design spec for project Phoenix" in a subject line or message body. The query module 124 can transmit a further query 134 the contact server 108 for a group contact card 111 containing contact information of team members assigned to project Phoenix.

As shown in FIG. 2C, in response to the queries 134, the file management server 103, the email server 106, and the contact server 108 can each provide a query result 136 containing the requested additional content to the query module 124. Upon receiving the query results 136, the query module 124 can forward the received additional content to the surface module 126 for further processing. Even though the foregoing query operations are described in the context of the file management server 103, the email server 106, and the contact server 108, in other embodiments, the query operations can also be applied to instance message servers, text message servers, or other suitable systems in the computer productivity platform 100.

Figure 2D:
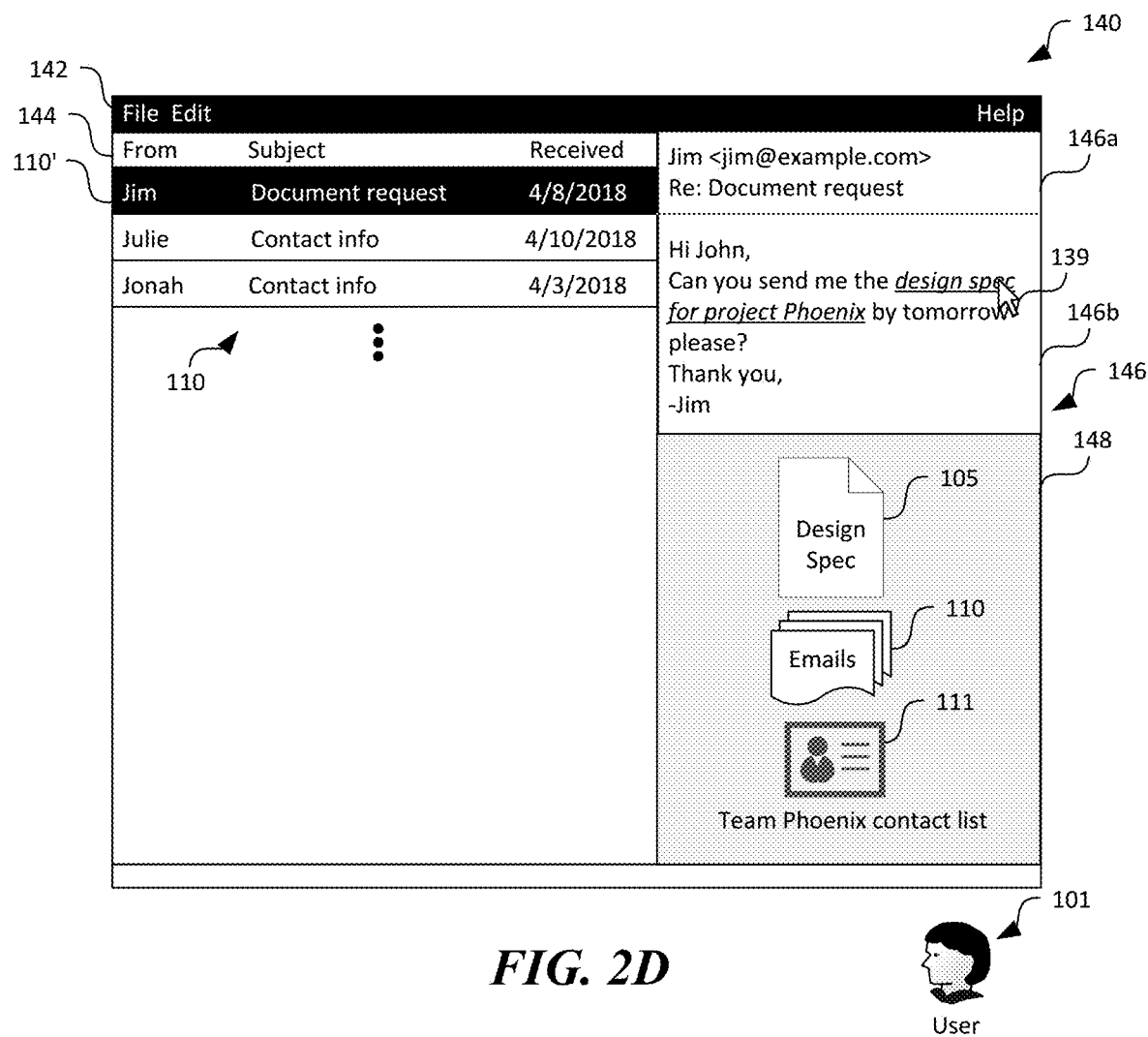
FIGS. 2D and 2E are schematic diagrams illustrating an example user interface suitable for the computer productivity platform of FIG. 1 in accordance with embodiments of the disclosed technology.

The surface module 126 can be configured to output or surface the received additional content (or a link to the additional content) in the user interface 140. For instance, as shown in FIG. 2D, the user interface 140 can be expanded to include a content pane 148 configured to output the additional content. In the illustrated example, the additional content includes a file 105 with a file name "Design Spec," multiple emails 110, and a contact card 111 entitled "Team Phoenix contact list." In other examples, one or more of the additional content items may be surface as, for instance, a hyperlink to a network location at which the content item may be retrieved. In further examples, the additional content may be surfaced as icons, zip files, or in other suitable forms.

As such, when the user 101 is viewing the message body of the email 110', the email client application 116 (FIG. 2A) can automatically provide relevant content to any requests or commitments included in the viewed email. Thus, the user 101 can efficiently prepare a response email to, for instance, "Jim," without having to manually searching or browsing various sources at the computer productivity platform 100 to locate the additional content. The user 101 can also provide accurate and complete response because the query module 122 (FIG. 2A) can be configured to search all suitable sources of the computer productivity platform 100.

Figure 2E:
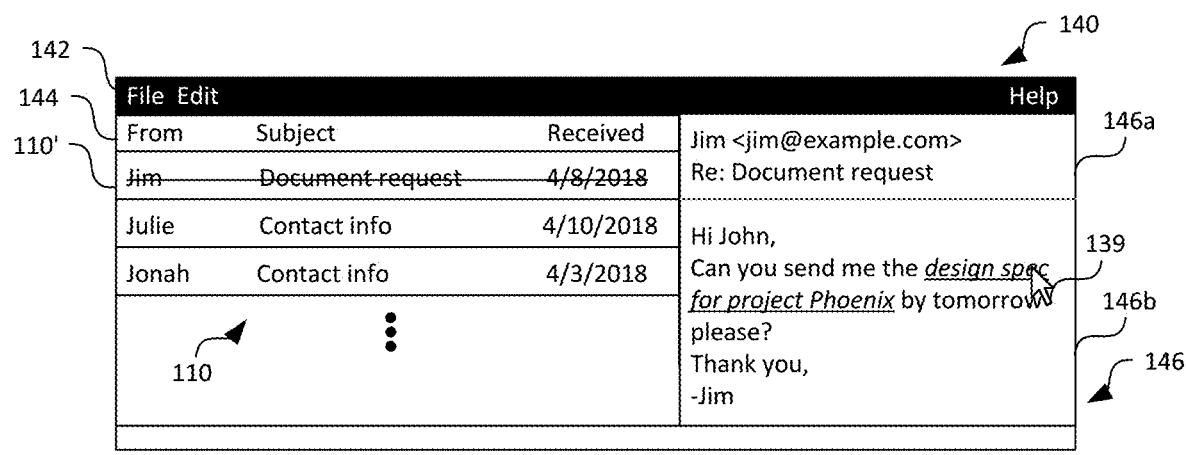

In certain embodiments, the detection module 122 (FIG. 2A) can also be configured to detect whether a response email has been sent by the user 101 to fulfill the request or commitment. In response to determining that a response email has been sent by the user 101 to fulfill the request or commitment, the detection module 122 can mark the request or commitment as complete. The detection module 122 can also cause the display module 121 to remove the corresponding email 110' from the action pane 144 (shown as stricken through), as shown in FIG. 2E.

Figure 3:
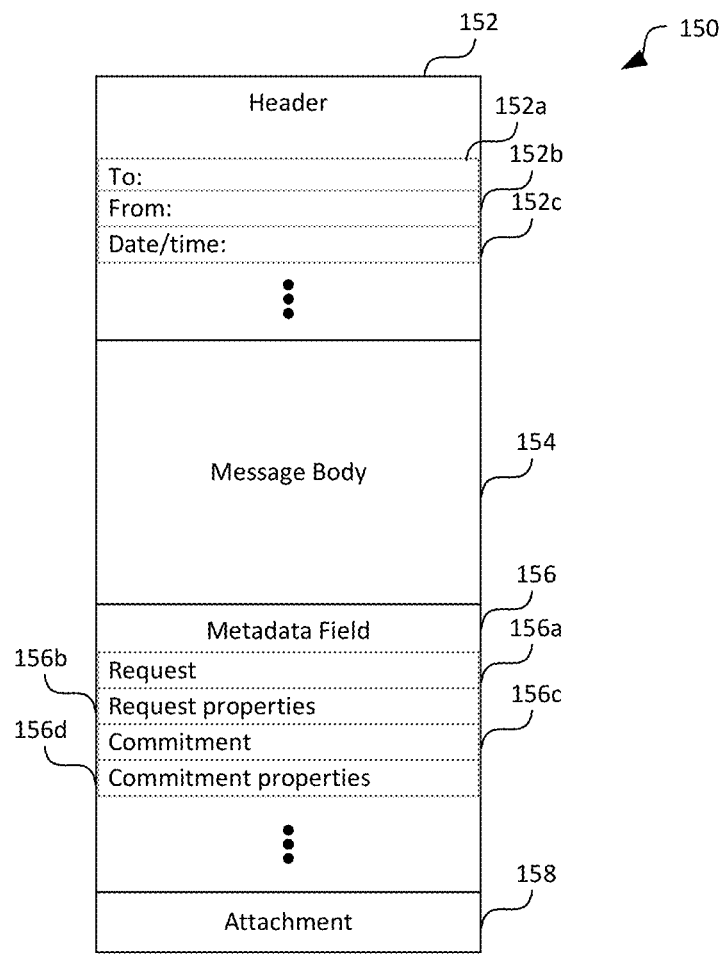
FIG. 3 is a schematic diagram illustrating an example data structure of an email suitable for the computer productivity platform of FIG. 1 in accordance with embodiments of the disclosed technology.

FIG. 3 is a schematic diagram illustrating an example data structure 150 of an email suitable for the computer productivity platform of FIG. 1 in accordance with embodiments of the disclosed technology. As shown in FIG. 3, the data structure 150 can include a header 152 with multiple header fields, such as "To" filed 152a, "From" filed 152b, and "Date/time" field 152c. In other embodiments, the header 152 can also include "Reply to," "Urgency," or other suitable header fields.

The data structure 150 can also include a message body 154 configured to contain content of an email. In one embodiment, the content can include plain text. In other embodiments, the content can include formatted text or other suitable types of text. The data structure 150 can also include a metadata field 156 containing various properties related to the content in the message body 154. In the illustrated example, the metadata field 156 includes a request field 156*a*, a request property field 156*b*, a commitment field 156*c*, and a commitment property field 156*d*. In other examples, the metadata field 156 can include other suitable types of structured or unstructured data. The data structure 150 can optionally include an attachment field 158 containing one or more attachments of documents, photos, or other suitable types of files.

Figure 4A:
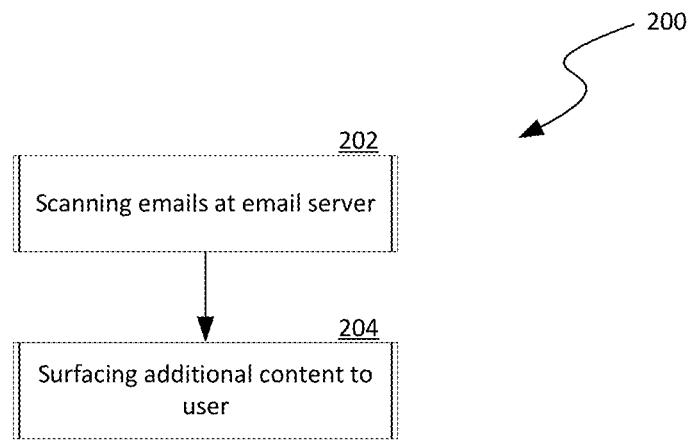
FIGS. 4A-4C are flowcharts illustrating various aspects of a process of relevant content surfacing in computer productivity platform in accordance with embodiments of the disclosed technology.
Figure 4B:
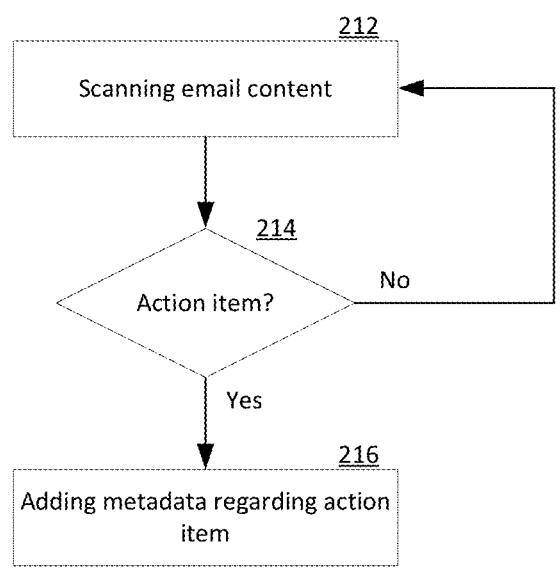
Figure 4C:
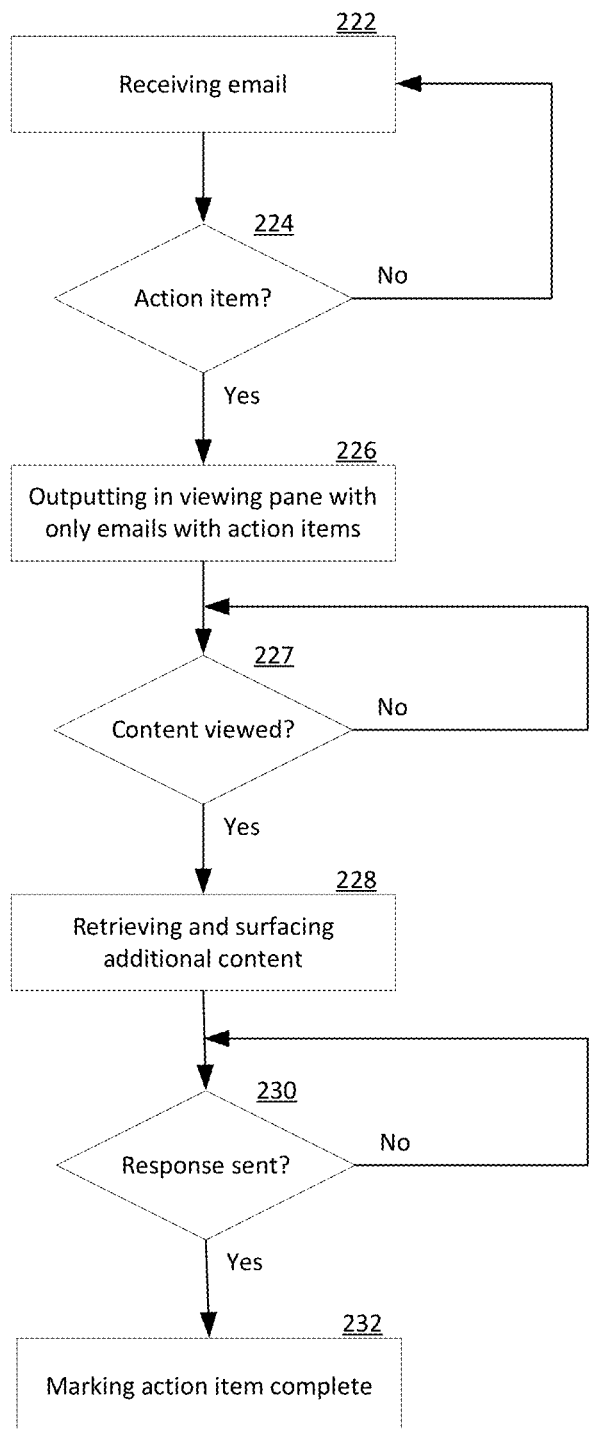

FIGS. 4A-4C are flowcharts illustrating various aspects of a process 200 of relevant content surfacing in computer productivity platform in accordance with embodiments of the disclosed technology. Even though the process 200 is described below with reference to the computer productivity platform 100 of FIG. 1 and the hardware/software components shown in FIGS. 2A-2E, in other embodiments, the process 200 can be implemented in other suitable computing platforms with additional and/or different components.

As shown in FIG. 4A, the process 200 can include scanning content of emails at an email server to identify a request or commitment included in a message body of the emails at stage 202. Such scanning does not collect or store personal identifiable information, such as names, user IDs, etc. Instead, the scanning identifies whether text included in the message body contains a request to or a commitment by a user, and thus contains an action item. The identified request or commitment and associated properties can then be stored in the emails as metadata, as described above with reference to FIG. 2A. Example operations of scanning content of emails are described in more detail below with reference to FIG. 4B. The process 200 can also include surfacing additional content to a user based on the metadata included with the emails at stage 204, as described above with reference to FIGS. 2A-2D. Example operations of scanning content of emails are described in more detail below with reference to FIG. 4C.

FIG. 4B illustrates example operations of scanning content of an email. As shown in FIG. 4B, the operations can include scanning content of the email at stage 212. The operations can then include a decision stage 214 to determine whether the email content contains an action item. In response to determining that the email content contains an action item, the operations include inserting, appending, or otherwise adding metadata to the email indicating existence of the action item and associated properties at stage 216. Otherwise, the operations reverts to scanning email content of additional emails at stage 212.

FIG. 4C illustrates example operations of surfacing additional content to a user. As shown in FIG. 4C, the operations can include receiving an email with metadata at stage 222. The operations can then include a decision stage 224 to determine whether the email contains an action item based on, for example, the metadata included with the email. In response to determining that the email contains an action item, the operations can include outputting the email in a viewing pane with only emails having action items at stage 226. The operations can then include another decision stage 227 to determine whether the user is viewing the content of the email. In response to determining that the user is viewing the content of the email, the operations can include retrieving and surfacing additional content from the computer productivity platform 100 (FIG. 1) at stage 228, as described in more detail above with reference to FIGS. 2A-2D. The operations can then include a further decision stage 230 to determine whether a response to the request or commitment has been sent by the user. In response to determining that a response to the request or commitment has been sent by the user, the operations can include marking the action item included in the email as complete and removing the email from the viewing pane containing only emails with action items at stage 232.

Figure 5:
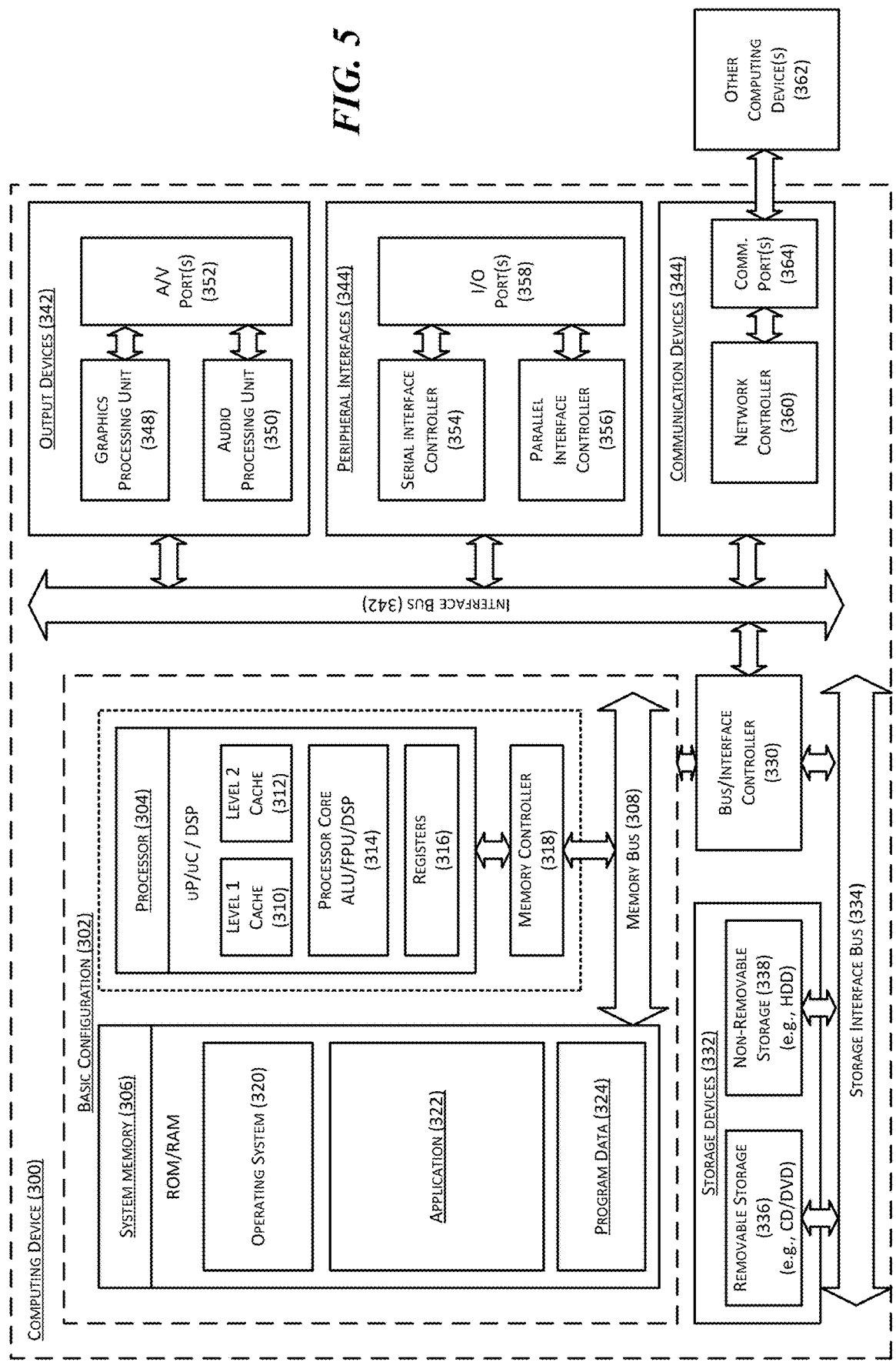
FIG. 5 is a computing device suitable for certain components of the computing system in FIG. 1.

FIG. 5 is a computing device 300 suitable for certain components of the computer productivity platform 100 in FIG. 1. For example, the computing device 300 can be suitable for the client devices 102, file management server 103, email server 106, or the contact server 108 of FIG. 1. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (pP), a microcontroller (pC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated in FIG. 7 by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. The computing device 300 can also be implemented as a personal computer including both laptop computer and non-laptop computer configurations.

Specific embodiments of the technology have been described above for purposes of illustration. However, various modifications can be made without deviating from the foregoing disclosure. In addition, many of the elements of one embodiment can be combined with other embodiments in addition to or in lieu of the elements of the other embodiments. Accordingly, the technology is not limited except as by the appended claims.

We claim:

1. A method of related content surfacing in a computer productivity platform having multiple servers interconnected by a computer network, the method comprising:
   receiving, at an email server of the computer productivity platform, an email destined to a user, the email having a message body containing content; and
   in response to receiving the email, at the email server,
      detecting whether the content of the email contains a request to or a commitment by the user; and
      in response to detecting that the content of the email contains a request to or a commitment by the user, inserting metadata into the email, the metadata indicating that the email contains a request to or commitment by the user and containing one or more properties of the detected request or commitment, wherein the one or more properties include an identification or description of a content item that is a subject of the request or commitment;
   determining, at a client device of the user, whether the email contains a request or commitment based on the metadata inserted by the email server; and
   in response to (i) determining that the email contains a request or commitment based on the metadata and (ii) detecting viewing of the content of the email by the user at the client device,
      extracting, at the client device of the user, the identification or description of the content item that is the subject of the request or commitment from the metadata inserted into the email by the email server;
      querying the email server, a file management server, or a directory server at the computer productivity platform for additional content using the extracted identification or description of the content item that is the subject of the request or commitment as one or more keywords; and
      surfacing the additional content to the user as being related to the content in the message body of the email.

2. The method of claim 1 wherein:
   the one or more properties of the request or commitment includes an identification of a content item or a description of the content item; and
   querying includes querying the email server, the file management server, or the directory server at the computer productivity platform for one or more of a document, another email, or contact information of additional users using the identification or description of the content item as the one or more keywords.

3. The method of claim 1, further comprising:
   detecting a response email containing one or more items from the surfaced additional content being sent by the user; and
   in response to detecting the response email being sent, marking the received email having the metadata containing the request as complete.

4. A method of related content surfacing in a computer productivity platform having multiple servers interconnected by a computer network, the method comprising:
   receiving, at a computing device and via a computer network, an email destined to a user of the computing device, the email having:
      a message body having content; and
      metadata that can indicate that the email contains a request to or commitment by the user and contain one or more properties of the request or commitment wherein the one or more properties include an identification or description of a content item that is a subject of the request or commitment; and
   upon receiving the email, at the computing device,
      scanning the metadata of the received email to determine whether the email contains a request to or commitment by the user; and
      in response to determining that the metadata indicates that the email contains a request to or commitment by the user and upon detecting, at the computing device, viewing of the message body of the email by the user on the computing device, extracting the identification or description of the content item that is the subject of the request or commitment from the metadata included in the email;

querying, from the computing device and via the computer network, the computer productivity platform for additional content using the extracted identification or description of the content item that is the subject of the request or commitment as one or more keywords;

receiving, from the computer productivity platform and via the computer network, a query result containing the additional content; and surfacing the received additional content to the user as being related to the content in the message body of the email.

5. The method of claim 4 wherein receiving the email includes receiving the email having the metadata appended to the email by an email server of the computer productivity platform.

6. The method of claim 4 wherein:

receiving the email includes receiving the email having the metadata appended to the email by an email server of the computer productivity platform; and the method further includes:

determining, at the computing device, whether the received email contains a request to the user based on the metadata of the email; and in response to determining that the receiving email contains a request to the user, outputting the email on a user interface containing only emails having pending tasks.

7. The method of claim 4 wherein:

receiving the email includes receiving the email having the metadata appended to the email by the email server of the computer productivity platform; and the method further includes:

determining, at the computing device, whether the received email contains a request to the user based on the metadata of the email; and in response to determining that the receiving email contains a request to the user, outputting, on a user interface on the computing device, the email with an indicator that indicates to the user that the additional content is available from the computer productivity platform.

8. The method of claim 4 wherein:

receiving the email includes receiving the email having the metadata appended to the email by the email server of the computer productivity platform; and the method further includes:

determining, at the computing device, whether the received email contains a request to the user based on the metadata of the email; and in response to determining that the receiving email contains a request to the user, outputting, on a user interface on the computing device, an indicator that indicates to the user that the additional content is available; and detecting viewing of the message body of the email by the user includes detecting a user input selecting the outputted indicator.

9. The method of claim 4 wherein:

detecting viewing of the message body of the email by the user on the computing device includes detecting that the message body of the email is opened in an email client application or the message body is displayed in a preview pane on the email client application; and querying the computer productivity platform includes automatically querying, from the computing device and via the computer network, the computer productivity platform in response to detecting that the message body of the email is opened in the email client application or the message body is displayed in the preview pane on the email client application without additional user input.

10. The method of claim 4 wherein:

receiving the email includes receiving the email having the metadata indicating that the email contains a request to the user, the metadata also containing an identification of a requested item or a description of the requested item; and querying the computer productivity platform includes querying an email server, a file management server, or a directory server for the requested item using the identification of a requested item or the description of the requested item as the one or more keywords.

11. The method of claim 4 wherein:

receiving the email includes receiving the email having the metadata indicating that the email contains a request to or commitment by the user, the metadata also containing a due date of the request or commitment; and the method further includes sorting the email on the computing device according to the due date of the request or commitment contained in the metadata and not according to a date/time of reception of the email.

12. The method of claim 4 wherein:

receiving the email includes receiving the email having the metadata indicating that the email contains a request to or commitment by the user, the metadata also containing a due date of the request or commitment; and the method further includes:

detecting, at the computing device, a response email containing one or more items from the surfaced additional content being sent by the user; and in response to detecting the response email being sent, marking the received email having the metadata containing the request as complete.

13. The method of claim 4 wherein:

receiving the email includes receiving the email having the metadata indicating that the email contains a request to or commitment by the user, the metadata also containing a due date of the request or commitment; and the method further includes:

detecting, at the computing device, a response email containing one or more items from the surfaced additional content being sent by the user; and in response to detecting the response email being sent, ceasing to display the received email in a user interface on the computing device, the user interface containing only emails having pending tasks.

14. A computing device communicatively coupled to a computer productivity platform via a computer network, the computing device comprising:

a processor;

a display; and a memory operatively coupled to the processor and display, the memory containing instructions executable by the processor to cause the computing device to:

receive, at the computing device and via a computer network, an email destined to
a user of the computing device, the email having:
a message body having content; and
metadata that can indicate that the email contains a request to or commitment by the user and contain one or more properties of the request or commitment, wherein the one or more properties include an identification or description of a content item that is a subject of the request or commitment; and
upon receiving the email,
scan the metadata of the email to determine whether the email includes a request to or commitment by the user;
in response to determining that the metadata indicates that the email contains a request to or commitment by the user, output, via a user interface on the display, the received email with an indicator on the user interface indicating that additional content corresponding to the received email is available; and
upon detecting, at the client device, viewing by the user of the email outputted via the user interface on the display,
extract the identification or description of the content item that is the subject of the request or commitment from the metadata included in the email;
retrieve, via the computer network, additional content from the computer productivity platform using the extracted identification or description of the content item that is the subject of the request or commitment as one or more keywords; and
surface, via the user interface on the display, the retrieved additional content to the user as being related to the content in the message body of the email.

15. The computing device of claim 14 wherein the memory contains additional instructions executable by the processor to cause the computing device to:
determine whether the email contains a request to or commitment by the user based on the metadata of the email; and
in response to determining that the receiving email contains a request to or a commitment by the user, output, via a viewing pane of the user interface on the display, the email, the viewing pane containing only emails with pending tasks.

16. The computing device of claim 14 wherein the memory contains additional instructions executable by the processor to cause the computing device to:
determine whether the email contains a request to or commitment by the user based on the metadata of the email; and
in response to determining that the receiving email contains a request to or a commitment by the user, output, via the user interface on the display, the email with an indicator that indicates to the user that the additional content is available from the computer productivity platform.

17. The computing device of claim 14 wherein the memory contains additional instructions executable by the processor to cause the computing device to:
determine whether the email contains a request to or commitment by the user based on the metadata of the email; and
in response to determining that the receiving email contains a request to or a commitment by the user,
output, via the user interface on the display, the email with an indicator that indicates to the user that the additional content is available from the computer productivity platform; and
indicate viewing of the content in the message body of the email by the user is detected when a user input selecting the outputted indicator is detected.

18. The computing device of claim 14 wherein the memory contains additional instructions executable by the processor to cause the computing device to:
detect that the message body of the email is opened in an email client application or the message body is displayed in a preview pane of the email client application; and
to retrieve the additional content includes to retrieve the additional content from the computer productivity platform in response to detecting that the message body of the email is opened in the email client application or the message body is displayed in the preview pane on the email client application without additional user input.

19. The computing device of claim 14 wherein:
the metadata of the email indicates that the email contains a commitment by the user having a due date; and
the memory contains additional instructions executable by the processor to cause the computing device to sort the email according to the due date of the commitment contained in the metadata and not according to a date/time of reception of the email.

20. The computing device of claim 14 wherein the memory contains additional instructions executable by the processor to cause the computing device to:
detect a response email containing one or more items from the surfaced additional content is sent by the user; and
in response to detecting the response email being sent,
mark the email having the metadata containing the request or commitment as complete; and
remove the email from a viewing pane of the user interface containing only emails with pending tasks.

* * * * *